(12) United States Patent
Elbe et al.

(10) Patent No.: US 7,613,763 B2
(45) Date of Patent: Nov. 3, 2009

(54) APPARATUS AND METHOD FOR CONVERTING, AND ADDER CIRCUIT

(75) Inventors: Astrid Elbe, Munich (DE); Norbert Janssen, Munich (DE); Holger Sedlak, Sauerlach (DE)

(73) Assignee: Infineon Technologies AG (DE)

( * ) Notice: Subject to any disclaimer, the term of this patent is extended or adjusted under 35 U.S.C. 154(b) by 1020 days.

(21) Appl. No.: 11/090,914

(22) Filed: Mar. 24, 2005

(65) Prior Publication Data

US 2005/0193052 A1    Sep. 1, 2005

Related U.S. Application Data

(63) Continuation of application No. PCT/EP03/10596, filed on Sep. 23, 2003.

(30) Foreign Application Priority Data

Sep. 25, 2002    (DE) .............................. 102 44 738

(51) Int. Cl.
*G06F 7/508*    (2006.01)
(52) U.S. Cl. ..................................... 708/710
(58) Field of Classification Search .................. None
See application file for complete search history.

(56) References Cited

U.S. PATENT DOCUMENTS

| | | | |
|---|---|---|---|
| 6,334,136 B1 * | 12/2001 | Blomgren et al. | 708/710 |
| 2003/0028576 A1 * | 2/2003 | Bradley | 708/710 |
| 2003/0145033 A1 * | 7/2003 | Bradley et al. | 708/710 |

FOREIGN PATENT DOCUMENTS

| | | |
|---|---|---|
| DE | 36 31 992 A1 | 11/1987 |
| DE | 197 82 228 C2 | 12/1989 |
| GB | 2 254 743 A | 10/1992 |
| WO | WO-98/29800 A1 | 7/1998 |

OTHER PUBLICATIONS

G. A. Ruiz; "Compact four bit carry look ahead CMOS adder in multi-output DCVS logic"; Electronics Letters, vol. 32, No. 17, Aug. 15, 1996.

Fu-Chiung Cheng et al.; "Delay-Insensitive Carry-Lookahead Adders"; VLSI Design, 1997 Proceedings, 10th International Conference on Hyderabad, India Jan. 4-7, 1997, Los Alamitos, CA., USA, IEEE Comput. Soc, US, Jan. 4, 1997, pp. 322-328.

(Continued)

*Primary Examiner*—David H Malzahn
(74) *Attorney, Agent, or Firm*—Dickstein, Shapiro, LLP.

(57) ABSTRACT

An apparatus and method for converting a dual-rail input. The apparatus combines two useful operand bits and two auxiliary operand bits so that, in a data mode, two output operands of three output operands have a value which is different from that of the third output operand. In a preparation mode, the three output operands of the apparatus have the same value. The apparatus and method may preferably be employed in a three-operands adder as an interface between a dual-rail three-bits half adder and a sum-carry stage of a two-bits full adder so to achieve the same level of security as a full implementation of the three-operands adder in dual-rail technology, despite the two-bits full adder being implemented in single-rail technology.

23 Claims, 7 Drawing Sheets

OTHER PUBLICATIONS

Neil H. E. Weste & Kamran Eshraghian; "Principles of CMOS VLSI Design"; 1985, Addison-Wesly, United States of America, pp. 160-173.

G.A. Ruiz and M.A. Manzano; "Compact 32-bit CMOS adder in multiple-output DCVS logic for self-timed circuits"; IEE Proceedings—Circuits Devices Syst., vol. 147, No. 3, Jun. 8, 2000, pp. 183-188.

John L. Hennessy & David a. Patterson; "Computer Architecture A Quantitative Approach"; Appendix A. Morgan Kaurmann Publishers, Inc. 1996.

* cited by examiner

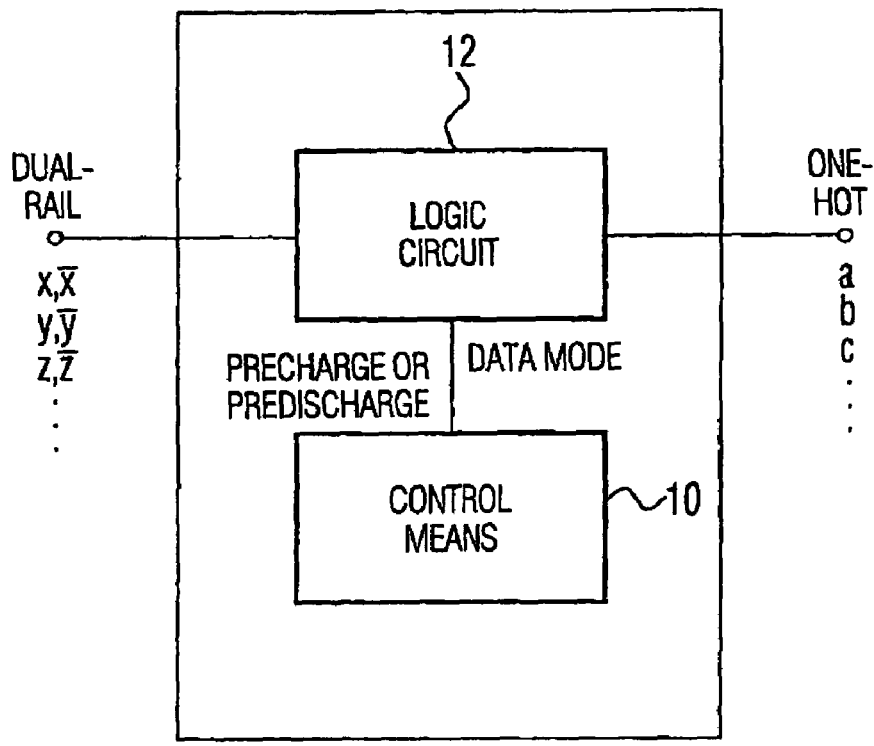

FIG 6

| | | | | |
|---|---|---|---|---|
| 61 — 1. LOCK Q=0 | PQ=1<br>KQ=1<br>GQ=1 | P=0<br>K=0<br>G=0 | HOLD ZERO IN THE OUTPUT STAGE | ↑<br>PREP.<br>MODE<br>↕ |
| 62 — 2. PrCH Q=0 | PQ=1<br>KQ=1<br>GQ=1 | P=0<br>K=0<br>G=0 | PRECHARGE CLOCK | |
| 63 — 3. PrCH Q=1 | PQ=1<br>KQ=1<br>GQ=1 | P=0<br>K=0<br>G=0 | PRECHARGE DEACTIVATED | ↑<br>DATA<br>MODE |
| 64 — 4. DATA IN | PQ →0 OR<br>KQ →0 OR<br>GQ →0 | P=1 OR<br>K=1 OR<br>G=1 | PQ, KQ, GQ ARE HELD | |
| 65 — 5. DATA OUT | "EVALUATE" P OR K OR G=1,<br>(DATA VALID) REMAINDER=0 | | | ↕ |
| 66 — 6. X, X̄, Y, Ȳ=0 | PRE-DISCHARGE IN THE INPUT STAGE | | | ↑<br>PREP.<br>MODE<br>↓ |
| 67 — 7. LOCKQ=1 | PQ OR<br>KQ OR<br>GQ TRANSIENT | P=0<br>K=0<br>G=TRANS | OUTPUT DATA INVALID | |
| 1. LOCK Q=0 | | | | |

(PRIOR ART)

APPARATUS AND METHOD FOR CONVERTING, AND ADDER CIRCUIT

CROSS-REFERENCE TO RELATED APPLICATION

This application is a continuation of copending International Application No. PCT/EP03/10596, filed Sep. 23, 2003, which designated the United States and was not published in English.

BACKGROUND OF THE INVENTION

1. Field of the Invention

The present invention relates to secure adder circuits and, in particular, to an apparatus and a method for converting a dual-rail input to a one-hot output.

2. Description of the Related Art

DE 3631992 C2 discloses a cryptography processor for performing the RSA public-key crypto system. Here, a modular exponentiation having a basis, and exponent and a module is broken down into a plurality of three-operands additions. The three operands include a module operand N, a multiplicand operand C and an intermediate-result operand Z. By appropriate shifting/weighting of the three operands before the addition, a multiplication/reduction accelerated by a multiplication-lookahead algorithm and reduction-lookahead algorithm may be performed.

FIG. 8 depicts part of the adder representing, as it were, the core of the cryptography processor shown in DE 3631992 C2. In particular, FIG. 8 shows two successive bit slices to calculate the two aggregate bits i−1 and i, to be precise from the three input operand bits $C_i$, $N_i$, $Z_i$; $C_{i-1}$, $N_{i-1}$, $Z_{i-1}$; and $C_{i-2}$, $N_{i-2}$ and $Z_{i-2}$, respectively.

From the point of view of a bit plane, the three-operands addition of C, N, Z is broken down into a two-level operation. A three-bits half adder 80 is provided for performing the first stage of the operation, each three-bits half adder 80 being upstream of a two-bits full adder 81. The three-bits half adder provides two output bits $x_i$, $y_i$, the output bits $x_i$, $y_i$ being fed into the downstream two-bits full adders as is depicted in FIG. 8. In particular, in each two-bits full adder of a bit slice, the less significant bit $y_i$ at the output of the three-bits half adder is combined with the highly significant bit of the three-bits half adder stage ($x_{i-1}$), which is one order down, in the two-bits full adder 81 to calculate an aggregate bit 82 and a carry bit 83. The three-operands addition is thus divided into two sections. In the first section, a sum of the three bits of the operands is formed at each binary digit. The sum may take on the values of 0 to 3 (in decimal notation). Thus, the sum may be represented in a binary manner with the two bits x, y. Since the sum is formed at each digit, two new figures may be combined from the two aggregate bits.

In the second section, both figures are added by the two-bits full adder 81 in the usual manner. The circuit connection such that a two-bits full adder always obtains, as an input, two output bits from two different three-bits half adders, leads to an extension of the calculating unit by one bit.

The three-operands adder shown in FIG. 8 is problematic in that provision is made neither of a backup of the input operands C, N, Z nor of a backup of the "intermediate operands" x, y. This is problematic in so far as, in particular in the normal case where all circuits are configured in a CMOS logic, switching one bit from 0 to 1 and from 1 to 0, respectively, leads to a current pulse which starts when a bit state is switched. As is known, CMOS circuits do not consume current in the static state. In the switching state, however, they do consume current. This current consumption may be determined by a power analysis. It is therefore possible, in principle, to derive information about C, N, Z so as to draw conclusions, for example, about the secret key used in an RSA operation.

An attacker could determine, for example by capturing the current profile, whether a switchover from 0 to 1 or from 1 to 0 has occurred. In a non-secured circuit, a switchover of a bit would occur whenever a current peak may be recognized in the current profile. Therefore, an attacker may re-enact, in his/her mind, the overall switchover behavior of a calculating unit using the current profile. The attacker then would only require one single bit in a whole sequence to be able to reconstruct therefrom whether a switchover from a "1" to a "0" or vice versa has occurred.

Specific CMOS circuits additionally exhibit the property that the switchover from 0 to 1 entails a power consumption which is different from that of the switchover from 1 to 0. By comparing two different current peaks, an attacker in this case immediately sees which bits have been processed in the calculating unit.

As a countermeasure to be taken against such power analysis attacks it has been proposed to employ a so-called dual-rail technology. In principle, in the dual-rail technology, each signal path is configured in a dual manner. For example, a signal x is processed in a normal manner on a first signal path. On the second signal path integrated in the same chip, it is not the signal x that is processed, but the complementary signal $\bar{x}$. The result is that whenever a transition occurs from, for example, 0 to 1 in the signal line, a complementary transition occurs in the other line, i.e. the second "rail". Therefore, there are always two transitions that occur on both lines for each bit transition. This leads to the fact that for circuits wherein transitions from 0 to 1 and from 1 to 0 require a different amount of current, it is no longer possible to find out whether a transition has occurred from 0 to 1 or from 1 to 0. This is due to the fact that the current profile contains, for each circuit transition, a peak which is the superposition of the current consumption of both rails. The dual-rail technology provides a high level of security, but suffers from the disadvantage that all circuits normally have to have a double configuration and that the power consumption of the entire circuit is also double. On the other hand, the circuit is already immune, to a certain extent, to power analysis attacks.

If only dual-rail technology is employed, it is still recognizable, by means of the current profile, whether a specific bit has transitioned from 0 to 1 or from 1 to 0 or whether it has remained the same compared to the previous clock cycle. In the event of a bit transition, a power peak is actually evident. However, the power peak is not evident if a bit has remained, for example, at 1 or at 0, i.e. has not changed, from one cycle to the next. In order to fend off attacks based on this effect it has been proposed to complement the dual-rail technology by a precharge/predischarge mode. The circuit is operated alternatively in a data mode and in a preparation mode (precharge/predischarge mode). Each data cycle is preceded by a preparation cycle wherein, in the case of precharge, both rails, i.e., for example, x and $\bar{x}$, are precharged to "1" so as to feed thereafter, in the data mode, the two rails with complimentary input signals to be processed. This leads to the fact that it is always exactly the same number of transitions that take place from a data cycle to a preparation cycle or from a preparation cycle to a data cycle. If the preparation mode is configured as a predischarge mode, in the preparation mode, all input data is not initialized to 1, as in the precharge mode, but "predischarged" to 0. Then there will be exactly the same number of transitions from a preparation cycle to a data cycle and vice versa.

As has already been explained, a three-operands adder is required for performing modular operations, e.g. addition or multiplication, for example, within the framework of cryptographic algorithms such as RSA or elliptic curves. Due to the various reasons, these operations must be performed, by the adder, in a manner which is secure against power attacks. Since cryptographic calculations require a very high amount of calculating expenditure, the adder must have a large amount of power available to it. Since, in particular in cryptography, long operands must be processed, the length of the operands in elliptic curves ranging from 100 to 200 bits and, in the field of RSA, ranging from 1024 to 2048 bits, the adder itself has a long bit length to achieve the speed requirements placed upon the calculating unit. Due to this long bit length, however, it is essential, from an economic point of view, to design the adder with as little area as possible—the bulk cost is usually accounted for by the chip area. Therefore, a calculating unit is required which has high speed, is secure and also requires a small amount of area all at once.

As has already been discussed, the three-operands adder disclosed in DE 3631992 C2 provides no security against hardware attacks. If both the three-bits half adder and the two-bits full adder were fully configured in dual-rail with precharge, this would provide a high level of security but will also mean an immense space requirement.

SUMMARY OF THE INVENTION

It is an object of the present invention to provide a secure and efficient concept for performing an addition with at least three operands.

In accordance with a first aspect, the present invention provides an apparatus for converting a dual-rail input, having two useful operand bits and two auxiliary operand bits, to an output having three output operands, the two auxiliary operand bits being, in a data mode, complementary to the two useful operand bits, the apparatus having: control means for alternately operating the apparatus in a data mode and in a preparation mode following the data mode and again a data mode following the preparation mode; and a logic circuit for combining the two useful operand bits and the two auxiliary operand bits such that, in the data mode, two output operands of the three output operands have a value which is different from that of a third output operand of the three output operands, and wherein the logic circuit is further configured to ensure, in the preparation mode, that the three output operands have the same value.

In accordance with a second aspect, the present invention provides an adder for adding three operands, having: a three-bits half adder in dual-rail technology which is operable in a preparation mode and in a data mode so as to calculate two dual-rail output operands from three dual-rail input operands; a two-bits full adder, having: an apparatus for converting a dual-rail input, comprising two useful operand bits and two auxiliary operand bits, to an output having three output operands, the two auxiliary operand bits being, in a data mode, complementary to the two useful operand bits, the apparatus having: control means for alternately operating the apparatus in a data mode and in a preparation mode following the data mode and again a data mode following the preparation mode; and a logic circuit for combining the two useful operand bits and the two auxiliary operand bits such that, in the data mode, two output operands of the three output operands have a value which is different from that of a third output operand of the three output operands, and wherein the logic circuit is further configured to ensure, in the preparation mode, that the three output operands have the same value, for generating single-rail lookahead parameters from two dual-rail output bits; and a sum-carry stage for calculating an aggregate bit and a carry bit from the single-rail lookahead parameters.

In accordance with a third aspect, the present invention provides a method for converting a dual-rail input, having two useful operand bits and two auxiliary operand bits, to an output having three output operands, the two auxiliary operand bits being, in a data mode, complementary to the two useful operand bits, the method having the steps of: operating the apparatus alternately in a data mode, in a preparation mode following the data mode and again in a data mode; and combining the two useful operand bits and the two auxiliary operand bits such that, in the data mode, two output operands of the three output operands have a value which is different from that of a third output operand of the three output operands, and ensuring that, in the preparation mode, the three output operands have the same value.

In accordance with a fourth aspect, the present invention provides a computer program having a program code for performing the method for converting a dual-rail input, having two useful operand bits and two auxiliary operand bits, to an output having three output operands, the two auxiliary operand bits being, in a data mode, complementary to the two useful operand bits, the method having the steps of: operating the apparatus alternately in a data mode, in a preparation mode following the data mode and again in a data mode; and combining the two useful operand bits and the two auxiliary operand bits such that, in the data mode, two output operands of the three output operands have a value which is different from that of a third output operand of the three output operands, and ensuring that, in the preparation mode, the three output operands have the same value, if the program runs on a computer.

BRIEF DESCRIPTION OF THE DRAWINGS

These and other objects and features of the present invention will become clear from the following description taken in conjunction with the accompanying drawings, in which:

FIG. 1 is a block diagram of an apparatus for converting a dual-rail input to a one-hot output;

FIG. 2 is a truth table of the mode of operation of the circuit of FIG. 1 in the data mode;

FIG. 6 is a flow chart for operating the circuit of FIG. 5 in the data mode and in the preparation mode;

DETAILED DESCRIPTION OF EXEMPLARY EMBODIMENTS OF THE INVENTION

Figure 3:
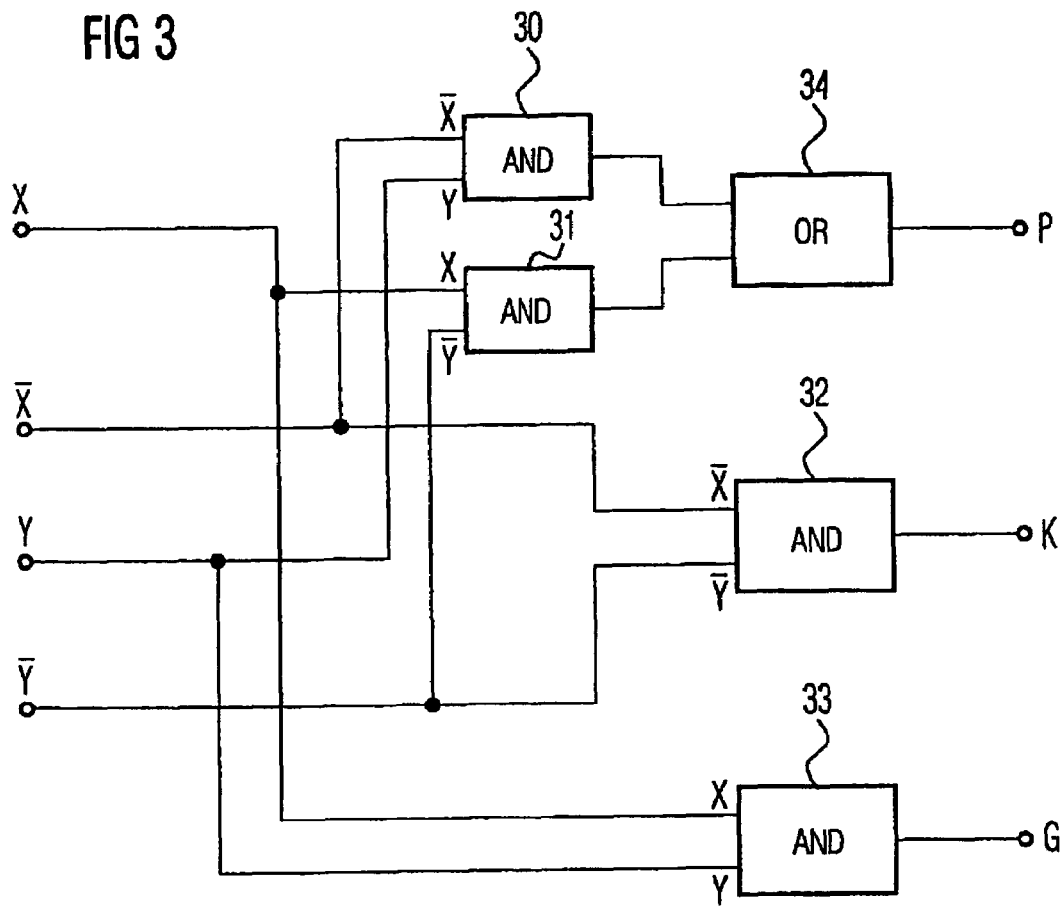
FIG. 3 is an exemplary implementation of the logic circuit of the conversion apparatus.

The present invention is based on the findings that a more or less high level of security may be achieved if only the three-bits half adder is configured in dual-rail with precharge/predischarge, and if the subsequent two-bits full adder, which consists of a series connection of a carry-lookahead element and a sum-carry element, is still configured in single rail, which leads to the fact that even though the three-bits half adder consumes double the chip area due to its full dual-rail configuration, the two-bits full adder, however, is only configured in single rail, so that the latter consumes only half of the chip area compared to full dual-rail configuration.

In accordance with the invention, the fact that the carry-lookahead element provides, for calculating a propagate value P, a kill value K and a generate value G, an output representing a one-hot coding is benefited from. In the one-hot coding of an output consisting of several output lines there is only ever one output line that differs from all other output lines. By operating the one-hot coded output in a data mode wherein the state of an output line is different from all other output lines, and in a subsequent preparation mode, which may be a precharge mode or a predischarge mode, it is ensured that it is always the same number of transitions that take place from one cycle to the next at the output of the carry-lookahead element, to be precise that it is always, for example, one single transition or, for example, two transitions.

The inventive three-operands adder which is fast, on the one hand, and secure, on the other hand, and also space-efficient, is therefore achieved by a dual-rail to one-hot converter which translates a dual-rail input into a one-hot coded output with at least three operands.

In accordance with the invention, use is made of the fact that a one-hot coding, if operated in a data mode and a preparation mode, fulfils the same security requirements as does a dual-rail system, this requirement being that it is always the same number of state alterations that occur from one clock cycle to the next, i.e. from a preparation cycle to a data cycle or vice versa, so that it may not be recognizable, by means of a power analysis, which bits are actually being processed in the data cycle.

The inventive apparatus for converting a dual-rail input to a one-hot coded output is advantageous in that it enables a dual-rail three-bits half adder and a single-rail two-bits full adder to be combined to provide a fast, secure and space-efficient adder for, preferably, a cryptoprocessor or cryptocoprocessor.

A further advantage of the inventive conversion circuit from dual-rail to one-hot is that the circuit fulfils, as it were, two functions at the same time; specifically, it combines, on the one hand, the dual-rail input signals in a logically correct manner to obtain correct one-hot coded output signals, and it provides, on the other hand, the conversion of dual-rail to single-rail "for free", as it were.

A one-hot coding, which is used particularly frequently in adders, is the propagate, kill and generate codings. These three signals, which are typical of adders, are defined such that it is only ever one signal that can be active at any one time. A pair of bits may only have either propagate=1 or kill=1 or generate=1. On the output side, the dual-rail to one-hot converter in accordance with the present invention is coupled to common single-rail sum-carry element which calculates, from the three lookahead parameters P, K, G and from a carry of the next adder stage down, both the aggregate bit of the current bit slice, and determines and outputs the carry bit from the current bit slice to the next slice up.

A further advantage of the inventive conversion apparatus is that the redundancy of the dual-rail half adder, which is tolerated for security reasons, may be advantageously used by the logic circuit of the inventive apparatus to calculate the one-hot coded output with a minimum number of transistors, since logical links, or combinations, may be performed not only due to the usual output signals of the half adder but also due to the present complementary output signals, so that the inventive converter, which, at the same time, calculates lookahead parameters and provides a dual-rail to one-hot conversion, may also be implemented in a manner which is economical in terms of transistors.

In the embodiment of the present invention, the logic part of the conversion apparatus additionally is not constructed in a normal complementary CMOS logic, but merely with NMOS transistors which, on the one hand, operate faster and, on the other hand, are easier to drive and/or are easier to be handled, on the whole, in terms of circuit design, than the PMOS transistors. The converter in accordance with this preferred embodiment of the present invention therefore has an NMOS-only-logic in contrast to a common CMOS logic wherein the transistor types always come up in pairs, i.e. an NMOS transistor co-operates with a PMOS transistor, etc.

FIG. 1 shows an apparatus for converting a dual-rail input comprising at least two useful operand bits x, y, z, and a corresponding number of auxiliary operand bits $\bar{x}, \bar{y}, \bar{z}$, to an output having at least three output operands a, b, c, the two auxiliary operand bits being, in a data mode, complementary to the two useful operand bits, and, depending on the embodiment, the two auxiliary operand bits having, in a preparation mode, the same values as the two useful operand bits. If the preparation mode is a precharge mode, both the useful operand bits and the auxiliary operand bits all have the same high voltage level. On the other hand, if the preparation mode is implemented by means of a predischarge, both the useful operand bits and the auxiliary operands bits have a same low voltage value. Typically, the high voltage value is referred to as Vdd, whereas the low voltage value is referred to as Vss and is typically 0 V.

The conversion apparatus in accordance with the invention shown in FIG. 1 includes control means 10 for operating the apparatus in a data mode and for operating the circuit in a preparation mode, the preparation mode following the data mode. Depending on the practical implementation, the preparation mode is one preparation cycle long, and the data mode is one data cycle long, a cycle being derived from a clock generator.

The inventive conversion apparatus depicted in FIG. 1 further includes a logic circuit 12 for combining at least two useful operand bits x, y, z and at least two auxiliary operand bits $\bar{x}, \bar{y}, \bar{z}$ such that, in the data mode, two output operands a, b of the, e.g., three output operands a, b, c have a value different from that of the third output operand, and wherein the apparatus of FIG. 1 is further configured to provide, in the preparation clock cycle, identical output operands a, b, c. In other words, the output shown in FIG. 1 representing, in the data mode, a one-hot coding, may be referred to as a "single-rail output" with precharge and/or with predischarge. In the preparation mode, the output values a, b, c have a low voltage state, such as 0 V, or Vss, in the event of predischarge. In the precharge operation as the preparation mode, the output operands a, b, c all have a logically high state (Vdd).

It shall be pointed out at this point that the inventive conversion apparatus may be used not only for calculating the lookahead parameters P, K, G, from dual-rail input bits x, y, and $\bar{x}, \bar{y}$, respectively, but that generally each dual-rail input, i.e. even an input with more than two useful operand bits, may be converted to a one-hot coding comprising more than two output lines. The inventive apparatus of FIG. 1 is thus suitable for any dual-rail to one-hot conversion as long as a logic circuit may be constructed which enables a conversion of the useful operand bits x, y, z, . . . to a one-hot coding in accordance with a mapping specification.

Even though mention has always been made above and will always be made below of "one-hot" encoding, it shall be pointed out here that a one-hot coding may evidently consist, e.g., in one of three lines having a high voltage state (Vdd), whereas the other two lines have a low voltage state (Vss). A one-hot coding is also an inverse mapping, as it were, wherein one line has a low voltage state (Vss), whereas the other two lines have a high voltage state (Vdd). In the case of inverse mapping, a data-state alteration will always take place, at the output of the apparatus depicted in FIG. 1, at the transition from a precharge mode to a data mode. In the precharge mode, all output lines are on Vdd, whereas in the data mode, at least one output line is on Vss. If the precharge mode is operated with a non-inverted one-hot coding, there will always be precisely two alterations of state that take place at a transition from the data mode to the preparation mode.

If, however, the predischarge mode is combined with the inverted data mode, there will also be two state alterations if a switch is made from a preparation cycle to a data cycle and vice versa. If, on the other hand, predischarge is combined with the non-inverted mapping of the one-hot coding, there will only be a state transition from a data cycle to the preparation cycle, and vice versa.

FIG. 2 shows a truth table of the functionality of the logic circuit 12 of FIG. 1 using the example of the generation of lookahead parameters P, K, G of a two-bits full adder. As is known, the lookahead parameter P, also referred to as propagate, designates the case where exactly one bit of two bits to be added equals 1. In this case, a carry coming from the next bit slice down is simply passed on and propagates. If, however, both input bits in one bit slice are equal to 1, this bit slice generates a new carry (generate). If, on the other hand, both input bits are equal to 0, a carry which may possibly enter into this bit slice will be absorbed by the next stage down by the currently considered bit slice, i.e. the carry is "killed".

It may be seen from the right-hand half of the table depicted in FIG. 2 that only ever either P, K or G have a logical state "1", i.e. that P, K, G together represent a one-hot coding.

The parameter P is calculated by XORing x and y. The parameter K is created by NORing x and y. The parameter G is created by performing an AND operation on x and y, as is described, for example, in "Computer Architecture a Quantitative Approach", Hennessy and Patterson, Morgan Kaufmann Publishers, Inc., 1996, annex A.

Considering the fact that the input into the inventive converter is a dual-rail input, i.e. that there are not only x and y, but also $\bar{x}$, and $\bar{y}$, a plurality of different logical operations may be employed to calculate the parameters P, K, and G in an efficient manner. A preferred implementation is represented in FIG. 3. The logic circuit depicted in FIG. 3 could be implemented in the logic circuit 12 shown in FIG. 1. It includes a first AND gate 30, a second AND gate 31, a third AND gate 32, a fourth AND gate 33 and an OR gate 34. $\bar{x}$, on the one hand, and y, on the other hand, are fed to the first AND gate 30. x, on the one hand, and $\bar{y}$, on the other hand, are fed into the second AND gate 31. The outputs of the two AND gates 30 and 31 are fed into an OR gate 34 to obtain the P output signal. The K output signal is obtained by performing an AND operation on $\bar{x}$ and $\bar{y}$ by means of the third AND gate 32. The output parameter G is obtained by performing an AND operation on x and y by means of the AND gate 33 of FIG. 3.

The logic circuit represented in FIG. 3 further has the advantage that in the event that the input parameters x, y, $\bar{x}$, $\bar{y}$, in the preparation mode, are all at the low state, results which are at the low state are provided at the output side in the preparation mode as well. The circuit depicted in FIG. 3 could therefore be employed as a conversion apparatus without any further modifications, in which conversion apparatus the input variables x, $\bar{x}$, y, $\bar{y}$ are subject to a predischarge operation in the preparation mode. If the input side of the logic circuit depicted in FIG. 3 was operated in the precharge mode, the AND gate 33 would provide, on the output side, as well as the AND gate 32 and the OR gate 34, a logically high signal in the event of a precharge. In the preparation mode, P, K and G would then be equal to 1. The circuit shown in FIG. 3 could therefore also be employed immediately for precharge-operated input data and would provide, in the precharge mode, on the output side, three identical parameters which now, however, comprise the logically high state (Vdd). If, on the other hand, the input data is operated in the precharge mode, and if low one-hot parameters are desired, on the output side, in the preparation mode, an inverter could be connected downstream of the gates 34, 33, and 32. Alternatively, the gates themselves could also be modified to provide inverted output signals. This goes to show that the inventive circuit may be configured for most varied applications which are determined by whether precharge or predischarge data is provided on the input side and whether or not precharge or predischarge parameters are needed on the output side.

Figure 4:
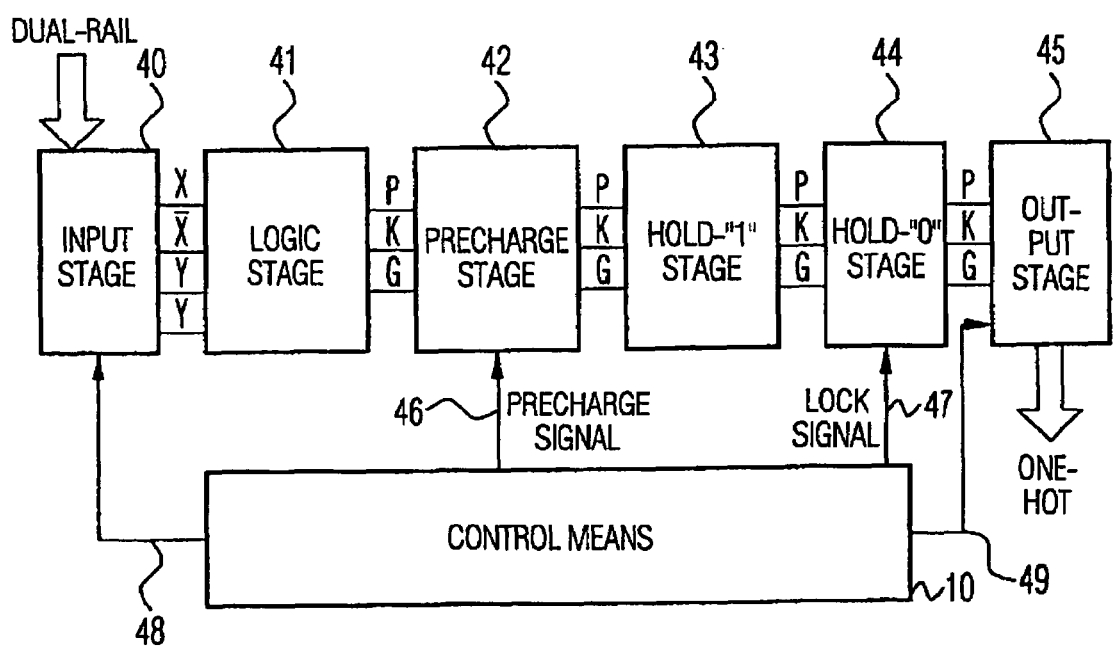
FIG. 4 is a more detailed representation of the conversion apparatus of FIG. 1, wherein secure potentials are provided both in the data mode and in the preparation mode.

FIG. 4 shows an overview block diagram of an inventive conversion apparatus in accordance with a preferred embodiment. The circuit shown in FIG. 4 is made up of an input stage 40, a logic stage 41, a precharge stage 42, a hold-"1" stage 43, a hold-"0" stage 44, an output stage 45 (the elements 40, 41, 42, 43, 44 and 45 correspond to means 12 of FIG. 1), and control means 10, which means are identical with the control means 10 shown in FIG. 1. The control means 10 are configured to provide a respective signal via lines 46, 47 to the precharge stage and to the hold-"0" stage, and to control, in a preferred embodiment of the present invention, the input stage via an input control line 48, and the output stage via an output control line 49 so as to provide a clear-cut situation for data coming from a preceding circuit, and data going to a subsequent circuit, i.e. so as to signalize whether the preparation mode or the data mode is present.

In the circuit shown in FIG. 4, it is in particular the hold-"1" stage 43 and the hold-"0" stage 44 that are of particular interest. The hold-"1" stage ensures that in the data mode, a "1" is securely held on lines P, K or G, whereas the hold-"0" stage 44 ensures that a "0" is also securely held on a line P, K or G. These two stages are of particular importance in the case where the data clock rates are such that charge drifts already occur in the circuit from one data cycle to the next, which charge drifts might lead to a reduced reliability of the circuit if the drift becomes too long. In particular, circuits 43 and 44 also enable the logic stage 41 to be implemented in the NMOS-only logic or, evidently "PMOS-only logic". Even though generally NMOS transistors are preferred in logic circuits, PMOS-only circuits may also be implemented by those skilled in the art on the basis of the present description. In contrast to normal CMOS modules, wherein logic gates are always constructed by paired complementary transistors, the inventive conversion circuit is advantageous in that no complementary implementation of the logic gates is required, so that the number of transistors may be reduced, and thus expensive chip area may be saved. So as not to introduce disadvantages due to transient drifts, it is preferred to provide the circuits 43 and 44. However, they are not used for holding the dual-rail input data, but for holding the one-hot coded output data which typically have a smaller number than the input data, so that, even if circuits 43 and 44 are provided, a gain in the chip area may be achieved in comparison with a common complementary gate implementation.

Figure 5A:
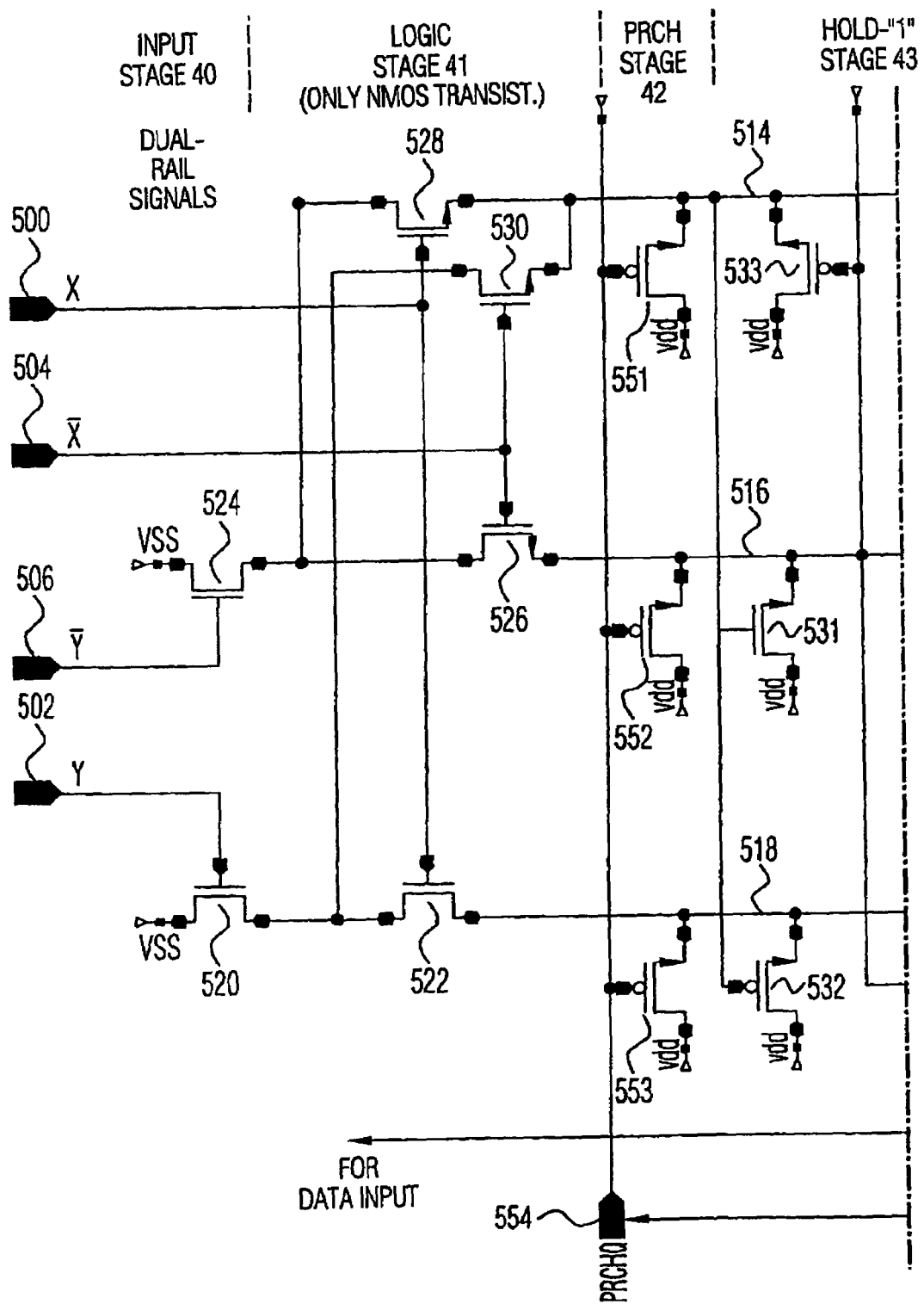
FIG. 5A is a schematic of the inventive circuit on a transistor level.
Figure 5B:
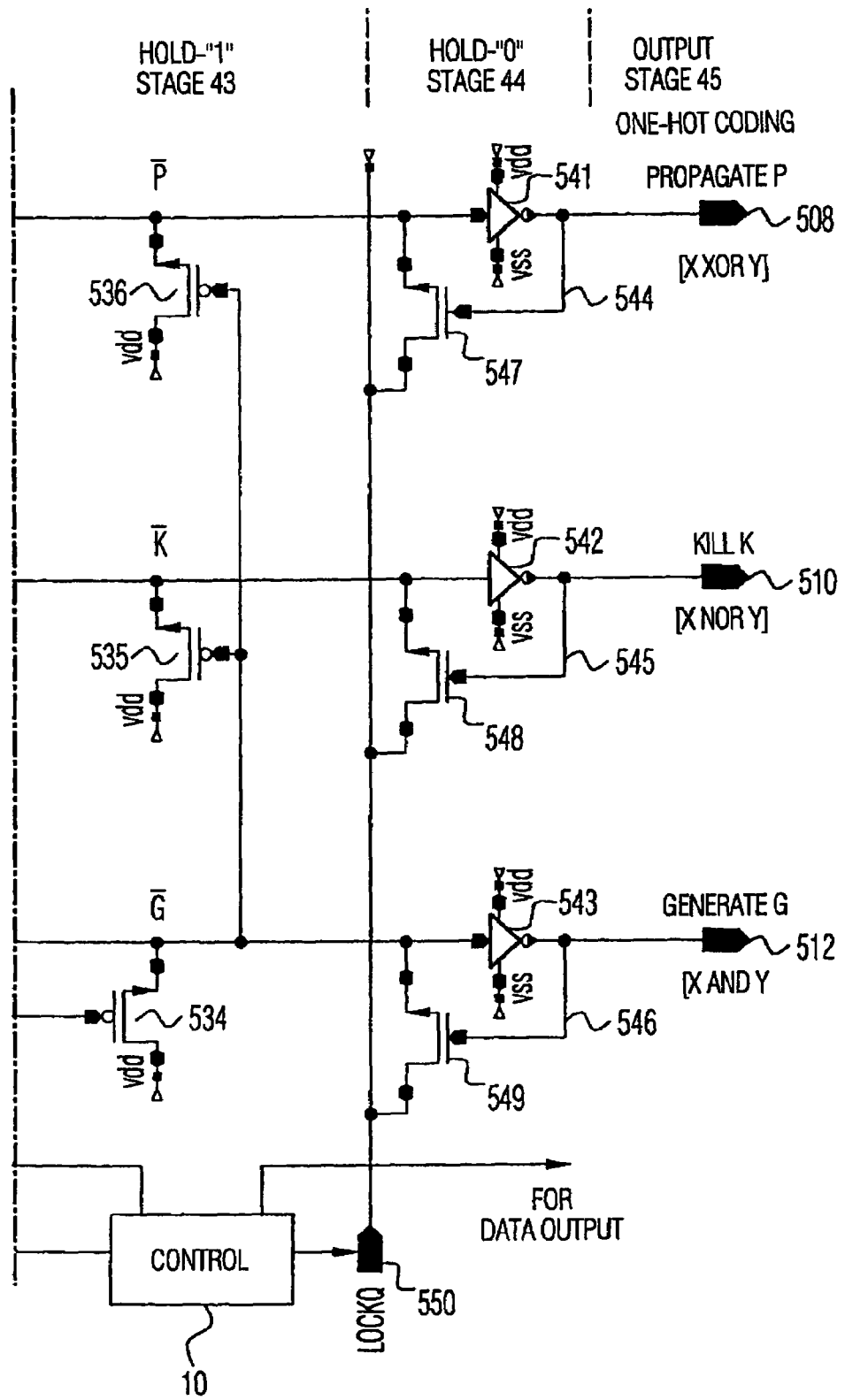
FIG. 5B is a schematic of the inventive circuit on a transistor level.

FIG. 5 shows a preferred embodiment of the inventive conversion apparatus at a transistor level. The first useful operand bit x is applied via an input 500. The second useful operand y is input via an input 502. The first auxiliary operand bit $\bar{x}$ is applied via an input 504, the auxiliary operand bit $\bar{x}$ being, in the data mode, complementary to the first auxiliary operand bit x input via the input 500. The second auxiliary operand bit $\bar{y}$ is input via an input 506, the auxiliary operand bit $\bar{y}$ being complementary to the second auxiliary operand bit y input via the input 502 if the circuit is operating in the data mode. The conversion apparatus shown in FIG. 5 includes the logic stage 41 which has already been mentioned with regard to FIG. 4 and which, in the embodiment shown in FIG. 5, merely consists of NMOS transistors. The first output signal of the one-hot coded output is the propagate signal P output via an output 508. The kill signal K is output via an output 510. The generate signal G is output via an output 512.

In the preferred embodiment shown in FIG. 5, it is not directly the propagate signal P that is produced at the output of the logic stage, but the inverted propagate signal $\bar{P}$ as is represented by a node 514. At a node 516, the inverted kill signal $\bar{K}$ is produced at the output of logic stage 41. Finally, the inverted generate signal $\bar{G}$ is produced at a node 518. A first NMOS transistor 520 and a second NMOS transistor 522 are provided for generating the generate signal $\bar{G}$. On the one side of the first NMOS transistor 520, the low reference voltage Vss is applied, which results in the node 518 being low only if both y (input 502) and x (input 500) have a logically high state. I this case, both transistors 520 and 522 are gated, and Vss is applied directly at node 518. If, on the other hand, either x or y or both are in a logically low state, the potential at node 518 is initially undetermined, i.e. floating, and is, as will be described below, held securely at a logically high state by the hold-"1" stage 43.

A third NMOS transistor 524 and a fourth NMOS transistor 526 are provided for producing the inverted kill signal $\bar{K}$. If both $\bar{x}$ and $\bar{y}$ are in a logically high state, both transistors 524 and 526 are gated, so that Vss is immediately applied at node 516. $\bar{K}$ is then in a low state. If, however, either $\bar{x}$ or $\bar{y}$, or both of them are in a logically low state (on Vss), the node 516 $\bar{K}$ is initially floating, i.e. not connected to Vss, and is driven to the logically high state (Vdd) by the hold-"1" stage 43, as will be described below.

The third NMOS transistor 524 forms, along with a fifth NMOS transistor 528, the second AND gate 31 of FIG. 3. The first AND gate 30 of FIG. 3, however, is implemented by the first NMOS transistor 520 and a sixth NMOS transistor 530. The outputs of both transistors 528 and 530 are connected to node 514 and thus imitate the OR gate 34 of FIG. 3. The inverted propagate signal $\bar{P}$ and/or node 514 is/are defined at the low voltage state Vss (due to transistor 524 and/or transistor 520) whenever an AND gate (30 or 31) provides a low voltage state (Vss) on the output side. In all other cases, the state of node 514 is initially floating and will be put into the defined logically high state (Vdd) by the hold-"1" stage 43.

In the embodiment depicted in FIG. 5, the logic stage 41 itself is therefore initially operative to calculate defined "0" states for $\bar{P}$, $\bar{K}$ or $\bar{G}$, whereas logically high states are not actively established by the logic stage 41, which is evident, in particular, from the fact that the logic stage is established only with Vss, i.e. the low voltage state, but does not comprise a node that is or may be connected to the high voltage, i.e. Vdd.

The secure establishment of the logically high states is effected by the hold-"1" stage 43. The hold-"1" stage 43 includes three circuits which are similar to each other and are each comprised of PMOS transistors. A first circuit of stage 43 is formed by a first PMOS transistor 531 and a second PMOS transistor 532. Both transistors 531 and 532 are configured to switch the high voltage potential Vdd present thereon to the node 516 ($\bar{K}$) and the node 518 ($\bar{G}$). The switching of the high potential Vdd to nodes 516 and 518, however, only occurs if a low potential, i.e. Vss, is present at node 514. Thus, if the propagate signal P is low, as is determined by logic stage 41, both nodes 516 and 518 are connected to Vdd, as it were, and are placed into the high state (Vdd) from the actually floating state in a defined manner.

The analog circuit arrangement for placing nodes 514 and 518 is comprised of a third PMOS transistor 533 and a fourth PMOS transistor 534. Both transistors 533 and 534 generally serve to place both nodes 514 and 518 to the defined logically high state in the case where node 516, i.e. $\bar{K}$, is placed on Vss in a defined manner.

The third analog circuit, which consists of a fifth PMOS transistor 535 and a sixth PMOS transistor 536, operates by analogy therewith. If it is determined, by the logic circuit, that the inverted generate signal $\bar{G}$ is low, the inverted kill signal $\bar{K}$ and the inverted propagate signal $\bar{P}$ are placed to the logically high state automatically, as it were, i.e. they are connected to Vdd by transistors 535 and 536. The inventive circuit is therefore configured to place "high" the two or several other output lines "regardlessly", as it were, whenever the signal on an output line has a data state calculated by the logic circuit. This is possible since it is a principal property of the one-hot coding that all output lines minus one output line have the same state which is complementary to the state of the one output line.

The hold-"0" stage 44 performs two functions. Initially each hold-"0" stage 44 includes an inverter 541, 542, 543 for each node to invert the inverted output signals $\bar{P}$, $\bar{K}$, and $\bar{G}$, respectively, such that the non-inverted output signals P, K, G are present at the outputs 508, 510 and 512. The inverters are not necessary in the event that the next circuit stage, e.g. a sum-carry stage, which is to be connected to the output stage 45, e.g. in accordance with FIG. 8, operates with inverted lookahead parameters. In the preferred embodiment shown in FIG. 5, the downstream sum-carry stage, however, is configured to operate with the non-inverted lookahead parameters. However, stage 44 performs another advantageous function. Specifically, it is provided to keep the "0", i.e. the logically low state, at nodes 514, 516, 518 irrespective of what is present at the input stage 40. To this end, feedback lines 544, 545, 546, respectively, are provided for each node 514, 516, 518, the feedback lines being connected to the gate of an NMOS transistor 547, 548 and 549, respectively. The transistors 547, 548, 549 are operative to place a signal present on a lockQ line 550 and provided by the controller 10, to a node 518, 516 or 514 which is gated accordingly. If lockQ=0 V, i.e. set to Vss, nothing will happen in the case where a node $\bar{P}$, $\bar{K}$, $\bar{G}$ is at +Vdd. In addition, nothing will happen if a node $\bar{P}$, $\bar{K}$, $\bar{G}$ is at 0 V. The signal lockQ 550 will not cause a switchover even in this case. However, an important advantage is that in the case where a "0", i.e. Vss, is at a node 514, 516 or 518, this "0" state, or Vss state, is maintained even if a manipulation takes place at logic stage 41, i.e. if, for example, transistors 520, 524 of logic stage 41 are switched for any reason, so that Vss is no longer present at the corresponding node 515, 516 and 518, respectively.

As will be explained below in more detail with reference to FIG. 6, the application of Vdd to the lockQ signal input 550 leads to the fact that in the case where a "0" state, i.e. Vss, is present at nodes 514, 516 and 518, respectively, this "0" state is converted to a "1" state, since by means of a 0, for example, on node 518, the inverted signal at the output of inverter 543 is a "1" which, when applied to the gate of the NMOS transistor 549, causes Vdd, which is present at the lockQ line 550, to be gated to node 518. The position lockQ is therefore not selected to be in the data mode, but in the preparation mode, as a preparation for pre-charging. A lockQ signal=Vdd has no effect on high states at nodes 514, 516 and 518, i.e. if these nodes are at Vdd, since in this case, transistors 547, 548 and/or 549 are never disabled, so that the lockQ potential is not transferred to nodes 514, 516, 518.

The precharge stage 42 includes, as is depicted in FIG. 5, a precharge transistor 551, 552, 553 for each node 514, 516, 518. The transistors 551, 552, 553 are configured as PMOS transistors. If Vss, i.e., for example, 0 V, is applied at a precharge input 554, also referred to as PrchQ, by controller 10, the three transistors 551, 552, 553 are switched to be conductive, so that the high potential Vdd is applied immediately to nodes 514, 516, 518. If the signal at the precharge input 554 is a high signal (Vdd), on the other hand, all three precharge transistors 551, 552, 553 are disabled such that these transistors and the precharge input 554 do not have any effect on the behavior of the circuit. The precharge input is therefore set to Vdd, i.e. to the high voltage state, in the data mode.

A preferred sequence of signal states and data input/output controllers for the preparation mode and the data mode will be represented below with reference to FIG. 6. In a step 61 picked at random, signal 550 (lockQ) is initially set to 0, i.e. to Vss. Since step 61 takes place in the preparation mode, PQ, KQ and GQ (i.e. $\overline{P}$, $\overline{K}$ and $\overline{G}$) are all at Vdd, and the outputs 508, 510, 512 are all at Vss. LockQ=0 has the consequence that the zeros are kept in the output stages, i.e. the "ones" are kept on nodes 514, 516, 518. Then, signal 554 (PrchQ) is set to 0 to perform the precharge clock. This leads to the fact that nodes 514, 516, 518 are all charged to a defined Vdd state, which leads to the consequence, as in 61, that outputs 508, 510, 512 are at Vss, as is desired for the preparation mode, i.e. the precharge and/or predischarge mode.

As is shown at 63 in FIG. 6, at the end of the precharge clock, the precharge line 554 is deactivated by applying Vdd, which has no effect, however, on nodes 514, 516, 518 or on outputs 508, 510, 512 due to the fact that lockQ=0 still applies. As is represented at 64 in FIG. 6, valid data may be fed to inputs 500, 502, 504, 506 essentially at the same time as or subsequent to the deactivation of the precharge state. In this case, the signals at inputs 500 and 504 are complementary to each other. In addition, the signals at the inputs 502 and 506 are complementary to each other. Logic stage 41 will cause one node, such as node 518, to change over from state Vdd, i.e. from a high state, to state Vss. In response to this, stage 43 will cause both nodes 514, 516, which are not established in a defined manner by logic stage 41, to be placed to, or kept in, the defined Vdd state. Due to the data fed, node 518 is connected to Vss via transistors 522 and 520 in the example described, as has been set forth.

This causes a "0" to be present at the input of inverter 543. This "0" is inverted to a "1", i.e. to Vdd, by inverter 543, Vdd at the output of inverter 543 causing the transistor 549 to become conductive. Since Vss is still present at lockQ 550, the feedback via the feedback line 546 and the gating of the transistor 549 will cause the low state of node 518 to be kept. Once node 518 is at a low potential in a stable manner, and therefore the output 512 is at high potential in a stable manner, "evaluate" may be performed (step 65), i.e. valid output data may be output from output stage 45. The data output may be controlled either via an output control line or it may be timed in that the subsequent sum-carry stage does not receive data from the inventive converter until secure states are present at outputs 508, 510, 512.

Then, one returns to the preparation mode from the data mode, as is represented at 66 in FIG. 6. In the preparation mode, the input data at the inputs 500-506 is all equal, and in the preferred embodiment shown in FIG. 5 it is all equal to 0. This means that the previous stage, i.e. the three-bits half adder having a dual-rail output performs a predischarge in its preparation mode. The imposition on inputs 500-506 directly leads to the fact that all three nodes 514, 516, 518 are floating, i.e. that none of the three nodes has the low potential Vss imposed on it. However, the initial state resulting from the data mode is maintained at the output by stage 43 and stage 44, irrespective of the fact that the input stage already has obtained preparation mode data. Therefore, data readout could also take place in step 66, even though step 66 is already considered part of the preparation mode in the terminology shown in FIG. 6. If the terminology "data mode" and "preparation mode" is made to refer to the input, i.e. to the situation at the input stage 40, step 66 is already part of the preparation mode. However, if the terminology is made to refer to the output, i.e. the output stage 45, step 66 still is part of the data mode. The output does not switch to the preparation mode until the lockQ signal is switched to "1".

In this case, node 518, which is actually floating and held by stage 44, is separated from Vss, which leads to the fact that feedback 546, inverter 543 and transistor 549 are in a transient state and that stage 43, which keeps the other two lines at "1" on the basis of the "0" on node 518, also get into a transient state, as it were. In this state, node 518 is no longer securely connected to Vss. Due to the fact that at the switch-on time of Vdd on line 550, transistor 549 is still open due to the previous conditions, at least some part of a charge is injected into node 518 via transistor 549 until node 518 comprises so much charge that the inverter 543 flips and thereby disables the transistor 549.

Next, lockQ is again placed to 0, which typically has no effect on nodes 514, 516 and 518. Thereafter, in the subsequent precharge clock in which precharge is activated (step 62), the lack of security of potential that may have arisen on the three nodes 514, 516, 518 due to steps 66 and 67, is rectified by securely connecting each node 514, 516, 518 to Vdd, i.e. by placing each node into the precharge state, which will transition to a data mode after having been deactivated.

The use of the step sequence lockQ=1 (step 67), lockQ=0 (step 61) and then PrchQ=0 (step 62) ensures that the respective inverters 541, 542, 543 are not "overdriven" against their state, which is possible, in principle, but may lead to a considerable shunt current through the inverter, which in turn would be accessible for current profile analyses. Instead, inverter 543 is still kept at its current state, for example by applying lockQ in step 66, since Vss is applied via lockQ 550 on the input side, and Vdd is applied on the output side. Thereafter, lockQ is switched to Vdd. This leads to the transient behavior described in that a charge is injected into node 518 until inverter 543 flips voluntarily, as it were, so as to stop, immediately after the flipping, the injection of charge into node 518 by disabling the transistor 549. Therefore, at no time inverter 543 has the same state imposed on it on the input side and on the output side, so as to forcibly overdrive, as it were, e.g. a "1" at the output of the inverter to a "0".

Figure 7:
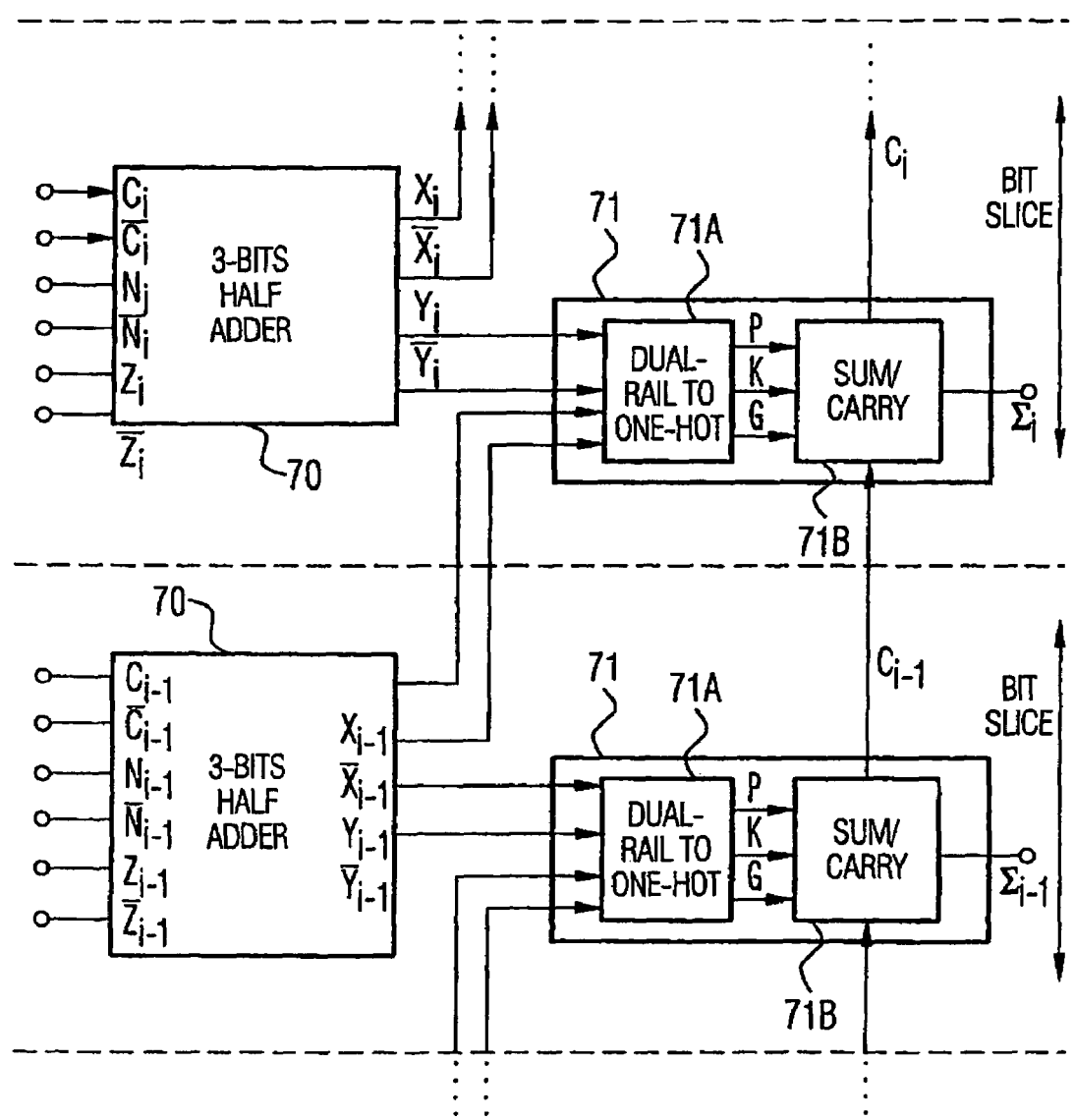
FIG. 7 is a block diagram of an inventive three-operands adder comprising the conversion apparatus of FIG. 1.

FIG. 7 depicts a block diagram of an inventive three-operands adder. In accordance with the invention, the three-bits half adder is implemented, in each bit slice, as a dual-rail circuit such that on the input side, the three operands are fed in as useful operand bits, and the three inverted operands are fed in as auxiliary operand bits in the data mode, whereas on the output side, the two bits x, y are output as useful operand bits, and bits $\bar{x}$ and $\bar{y}$ are output as auxiliary operand bits, in dual-rail as well. In the preparation mode, the three-bits half adder may be operated such that all input operands are equal to "0", which would correspond to the predischarge operation, or that all input operands have a high voltage stage, which would correspond to the precharge state. On the output side it is preferred for the signals $x_i, \bar{x}_i, y_i, \bar{y}_i$ to be predischarge signals, i.e. to be present at Vss in the preparation mode. A dual-rail three-bits half adder designated by 70 in FIG. 7 has a two-bits full adder 71 connected downstream of it for the respective bit slice, the two-bits full adder 71 having, as a first stage, the dual-rail to one-hot converter 71a depicted in FIGS. 1 and 5, and, as a second stage, a conventionally constructed sum-carry stage 71b to calculate the aggregate bit for the respective bit slice, and the carry bit of the respective bit slice for the next bit slice up. It shall be pointed out that due to the dual-rail converter 71a, common sum-carry stages 71b may be used, since stage 71b evidently does not know that the one-hot coded lookahead parameters P, K, G have been generated from dual-rail input values.

Figure 8:
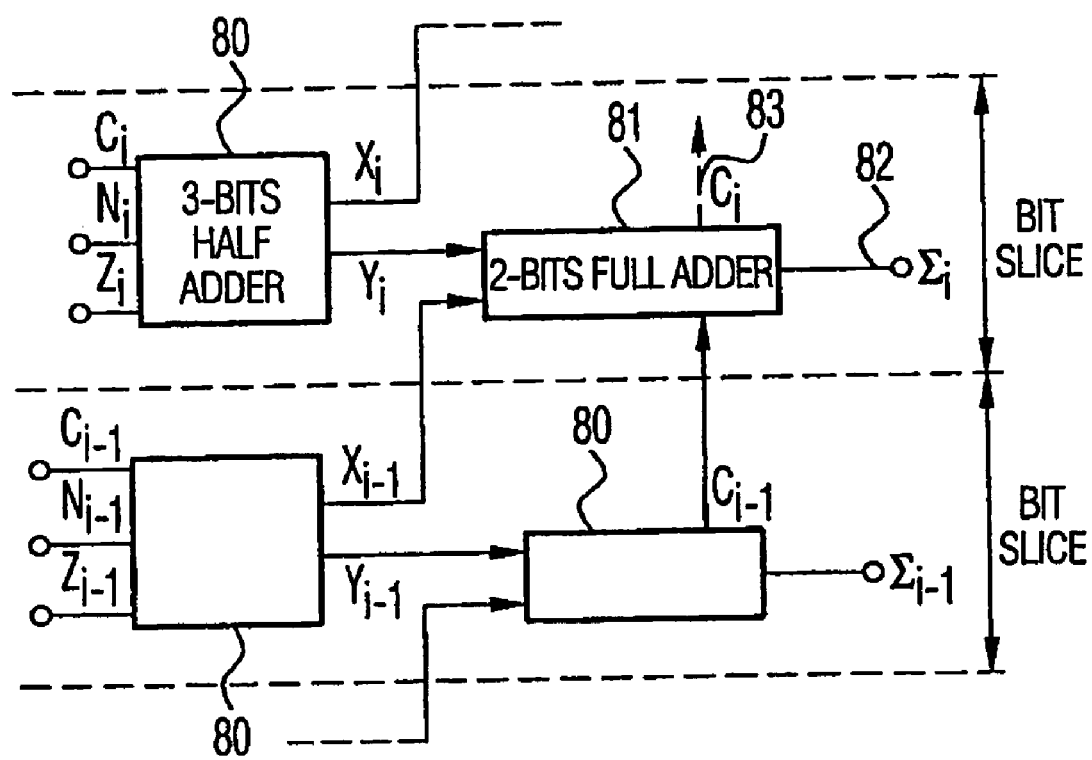
FIG. 8 depicts a known three-operands adder without security features.

The three-operands adder represented in FIG. 7 has the following advantages as compared to the known three-operands adder depicted in FIG. 8:

The half-adder stage is secured against hardware attacks due to its implementation in dual-rail technology with precharge/predischarge. Even though the two-bits full adder stage in FIG. 7 is implemented merely in single rail, it is still secured against hardware attacks due to the inherent properties of one-hot coding, but consumes only half the chip area in comparison with a full dual-rail implementation of the two-bits full adder stage. The three-operands adder shown in FIG. 7 may therefore be implemented in a space-efficient manner.

Due to the fact that the calculating unit shown in FIG. 7 and the calculating unit shown in FIG. 8 enable fast addition of three operands, the circuit depicted in FIG. 7 does not exhibit any losses in speed in comparison with the circuit shown in FIG. 8 if it is taken into account that the preparation mode of the circuit of FIG. 7, i.e. the precharge/predischarge operation, may be executed fast and, at the time, may be used for performing input/output operations or storage operations, so that, on the whole, the preparation mode is not important.

The adder concept depicted in FIG. 7, in particular, is not limited to three-operands adders but may be extended to N-operands adders, N being >3, since N-operands adders may be constructed of several three-operands adders in accordance with FIG. 7.

A further advantage of the concept shown in FIG. 7 is that three-bits adders implemented in dual-rail technology already exist, in particular as three-bits carry-save adders, so that already existing concepts may be employed for the inventive three-operands adder, these existing concepts having the advantage that they do no longer have to be developed and, in particular, tested.

The inventive dual-rail to one-hot converter may readily be combined with a sum-carry stage, which is also already known and has already been implemented and tested, so as to construct a carry-propagate adder, in the embodiment described, in the precharge mode, all circuit nodes $\bar{P}, \bar{K}, \bar{G}$, being 1, and in the data mode, wherein the one-hot coding is present, exactly one line going to 0. If FIG. 5 is considered, in particular, the reverse case could be realized by reversing the transistors, i.e. from NMOS to PMOS and from PMOS to NMOS, the said reverse case being that all nodes 514, 516, 518 of FIG. 5 are, in the preparation mode, at Vss, i.e. at a lower voltage, and that only one node, in the data operation, switches to a high voltage state in accordance with the one-hot coding. As has been explained, it is preferred to provide the inventive converter with a circuit ensuring that, in response to a valid data state on one node, the other nodes are set in a complementary manner/to be complementary, an additional circuit preferably being provided which keeps and/or "secures" the valid data state.

Another advantage of the inventive converter is that it may be implemented in a transistor-efficient, i.e. chip area-efficient manner if the complementary signals of the dual-rail input, i.e. the auxiliary operand bits, each finally lead to the fact that a logic may be constructed merely with transistors of a single transistor type, i.e. either NMOS or PMOS. To this end, NMOS transistors are preferred due to their easy handling for the circuit developer and due to their advantages in terms of speed.

Depending on the circumstances, the inventive method for converting may be implemented in hardware or software. The implementation may be effected on a digital storage medium, in particular a disk or CD with electronically readable control signals which may co-operate with a programmable computer system such that the respective method is performed. Generally, the invention therefore also consists in a computer program product with a program code, stored onto a machine-readable carrier, for performing the inventive method if the computer program product is executed on a computer. In other words, the present invention is therefore also a computer program having a program code for performing the method for converting if the computer program is executed on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for converting a dual-rail input to an output having three output operands, the dual-rail input comprising two useful operand bits and two auxiliary operand bits, the two auxiliary operand bits being, in a data mode, complementary to the two useful operand bits, the apparatus comprising:
    a controller configured to operate the apparatus in a data mode, followed by a preparation mode, followed again by a data mode; and
    a logic circuit configured to combine the two useful operand bits and the two auxiliary operand bits,
    wherein, in the data mode, two output operands of the three output operands have a value which is different from that of a third output operand of the three output operands, and
    wherein, the logic circuit is further configured to operate whereby, in the preparation mode, the three output operands have the same value.

2. The apparatus of claim 1, wherein the logic circuit further comprises an adder-lookahead functionality, whereby the three output operands represent lookahead parameters for the two useful operand bits.

3. The apparatus as claimed in claim 2,
    wherein a first of the output operands represents a propagate parameter or a complementary propagate parameter for the two useful operand bits, and wherein a second of the output operands represents a kill parameter or a complementary kill parameter for the two useful operand bits, and wherein a third of the output operands represents a generate parameter or a complementary parameter for the two useful operand bits.

4. The apparatus as claimed in claim 1, wherein the logic circuit further comprises:

a first AND operator configured to combine the first auxiliary operand and the second useful operand to generate a first AND output signal;

a second AND operator configured to combine the first useful operand and the second auxiliary operand to generate a second AND output signal;

an OR operator configured to combine the first AND output signal and the second AND output signal to provide a propagate parameter;

a third AND operator configured to combine the first auxiliary operand bit and the second auxiliary operand bit to provide a kill parameter; and a fourth AND operator configured to combine the first useful operand bit and the second useful operand bit to create a generate parameter.

5. The apparatus as claimed in claim 1, wherein the logic circuit comprises:

a combiner configured to logically combine the two useful operand bits and the two auxiliary operand bits whereby, in the data mode, the three output operands are calculated in accordance with a predetermined combining specification; and an ensurer circuit configured to ensure that two output operands of the three output operands in the data mode are each complementary to the third output operand.

6. The apparatus as claimed in claim 5, wherein the ensurer circuit comprises a hold-"1" stage configured to hold, in response to a valid "0" state of one of the three output operand, a complementary state in the two of the three output operands not at a valid "0" state.

7. The apparatus as claimed in claim 5, wherein the ensurer circuit comprises a hold-"0" stage, wherein the hold-"0" stage is configured to maintain a "0" state in response to a valid "0" state of one of the three output operands, independently of one or more inputs present at the logic circuit.

8. The apparatus as claimed in claim 1, wherein the controller controls the logic circuit, whereby the controller causes the logic circuit to perform:

entering a data mode;

entering a preparation mode; and again entering a data mode.

9. The apparatus as claimed in claim 1, wherein the logic circuit includes a preparator circuit, wherein the preparator circuit is configured to place, in the preparation mode, the three output operands at the same value independently of the values of the three output operands, and wherein the logic circuit is further configured to suppress, in the preparation mode, a shunt current from a point having a high voltage potential and a reference potential.

10. The apparatus as claimed in claim 1, wherein the logic circuit comprises: a logic stage configured to logically combine the useful operand bits and the input operand bits in accordance with a combining specification;

a precharge stage configured to place the output operands into the same state in the preparation mode;

a hold-"1" stage configured to hold two of the three output operands in an identical state in response to a state of the third output operand being complementary to the identical state; and a hold-"0" stage configured to hold the third output operand in the complementary state.

11. The apparatus as claimed in claim 10, wherein the logic stage is configured to utilize NMOS transistors exclusively.

12. The apparatus as claimed in claim 10, wherein the logic stage comprises:

a first transistor and a second transistor, wherein the first transistor is controlled by the second useful operand bit, the second transistor is controlled by the first useful operand bit, the first transistor and the second transistor are connected in series, a reference potential is applied at an input of the first and second transistors, and a complementary generate parameter is obtained at an output of the first and second transistors;

a third transistor and a fourth transistor, wherein the third transistor and the fourth transistor are connected in series, one of the transistors selected from the group of transistors consisting of the third and fourth transistors is connected to the reference potential, an inverted kill parameter is provided at an output of the one transistor selected from the group consisting of the third and fourth transistor that is not connected to the reference potential, the third transistor is controlled by the second auxiliary operand bit, and the fourth transistor is controlled by the first auxiliary operand bit;

a fifth transistor connected in series to the third transistor, wherein the fifth transistor provides, at an output of same, an inverted propagate parameter, and the fifth parameter is controlled by the first useful operand bit; and a sixth transistor, wherein the sixth transistor is controlled by the first auxiliary operand bit, the output of the sixth transistor is identical to the output of the fifth transistor, and the sixth transistor is connected in series to the first transistor.

13. The apparatus as claimed in claim 10, wherein the useful operand bits and the auxiliary operand bits are set in a low voltage state in the preparation mode, in response to a predischarge operation having been performed for the useful operand bits and the auxiliary operand bits.

14. The apparatus as claimed in claim 10, wherein the precharge stage and the hold-"1" stage utilize PMOS transistors exclusively.

15. The apparatus as claimed in claim 10, wherein the hold-"0" stage comprises, for each output operand:

an inverter, a feedback path and a lock transistor, wherein an input of the lock transistor is connected to a lock signal, and wherein an output of the lock transistor is connected to an input of the respective inverter.

16. The apparatus as claimed in claim 15, wherein the controller executes the following steps to facilitate a precharge operation:

maintain the lock signal at a low state in the data mode, maintain the precharge signal in a high state in the data mode, place the lock signal, in the preparation mode, in a high state, return the lock signal to a low state, and place the precharge signal into a low state, only after the lock signal has been placed in a low state.

17. The apparatus as claimed in claim 15, wherein the lock transistor is an NMOS transistor.

18. The apparatus as claimed in claim 17, wherein the lock signal in the data mode is set to a low reference potential, and wherein the lock signal is initially switched, in the preparation mode, to a high reference potential and is then switched again to the low reference potential.

19. The apparatus as claimed in claim 10, wherein the logic stage is configured to not impose a defined reference potential on one or more output parameter nodes in the preparation mode, and wherein the useful operand bits and the auxiliary operand bits have the same state.

20. An adder for adding three operands, comprising:
a three-bits half adder utilizing dual-rail technology, the three-bit half adder being operable in a preparation mode and in a data mode to calculate two dual-rail output operands from three dual-rail input operands;
a two-bits full adder, comprising:
an apparatus configured to convert a dual-rail input, comprising two useful operand bits and two auxiliary operand bits, to an output having three output operands, the two auxiliary operand bits being, in a data mode, complementary to the two useful operand bits, the apparatus comprising:
a controller configured to alternately operate the apparatus in a data mode, in a preparation mode following the data mode and again in a data mode following the preparation mode;
a logic circuit configured to combine the two useful operand bits and the two auxiliary operand bits whereby, in the data mode, two output operands of the three output operands have a value which is different from that of a third output operand of the three output operands, wherein the logic circuit is configured to ensure, in the preparation mode, that the three output operands have the same value for generating single-rail lookahead parameters from two dual-rail output bits; and
a sum-carry stage configured to calculate an aggregate bit and a carry bit from the single-rail lookahead parameters.

21. The adder of claim 20, wherein the three-bits half adder is configured to provide, in the preparation mode, output data in a low voltage state, and wherein the apparatus comprises a logic stage which utilizes NMOS transistors exclusively.

22. A method for converting a dual-rail input having two useful operand bits and two auxiliary operand bits, to an output having three output operands, the two auxiliary operand bits being, in a data mode, complementary to the two useful operand bits, the method comprising:
operating the apparatus alternately in a data mode, in a preparation mode following the data mode, and in a data mode again; and
combining the two useful operand bits and the two auxiliary operand bits whereby, in the data mode, two output operands of the three output operands have a value which is different from that of a third output operand of the three output operands; and
ensuring that, in the preparation mode, the three output operands have the same value.

23. A digital storage medium having stored thereon a computer program having program code for performing a method for converting a dual-rail input, comprising two useful operand bits and two auxiliary operand bits, to an output having three output operands, the two auxiliary operand bits being, in a data mode, complementary to the two useful operand bits, the method comprising:
operating the apparatus alternately in a data mode, in a preparation mode following the data mode and again in a data mode; and
combining the two useful operand bits and the two auxiliary operand bits whereby, in the data mode, two output operands of the three output operands have a value which is different from that of a third output operand of the three output operands, and
ensuring that, in the preparation mode, the three output operands have the same value.

* * * * *